US012449475B2

United States Patent
Sinai et al.

(10) Patent No.: US 12,449,475 B2
(45) Date of Patent: Oct. 21, 2025

(54) RESAMPLING WITH TDI SENSORS

(71) Applicant: Orbotech Ltd., Yavne (IL)

(72) Inventors: Doron Sinai, Petach Tikva (IL); Itzhak Saki Hakim, Kfar Saba (IL)

(73) Assignee: Orbotech Ltd., Yavne (IL)

( * ) Notice: Subject to any disclaimer, the term of this patent is extended or adjusted under 35 U.S.C. 154(b) by 216 days.

(21) Appl. No.: 18/035,148

(22) PCT Filed: Aug. 8, 2021

(86) PCT No.: PCT/IL2021/050964
§ 371 (c)(1),
(2) Date: May 3, 2023

(87) PCT Pub. No.: WO2022/107117
PCT Pub. Date: May 27, 2022

(65) Prior Publication Data
US 2023/0408579 A1     Dec. 21, 2023

Related U.S. Application Data

(60) Provisional application No. 63/115,761, filed on Nov. 19, 2020.

(51) Int. Cl.
*G01R 31/308* (2006.01)
*H04N 25/48* (2023.01)
*H04N 25/768* (2023.01)

(52) U.S. Cl.
CPC ........... *G01R 31/308* (2013.01); *H04N 25/48* (2023.01); *H04N 25/768* (2023.01)

(58) Field of Classification Search
CPC .... G01R 31/28; G01R 31/302; G01R 31/308; H04N 25/48; H04N 25/70; H04N 25/71; H04N 25/711; H04N 25/76; H04N 25/768
See application file for complete search history.

(56) References Cited

U.S. PATENT DOCUMENTS 7,009,163 B2   3/2006   Katzir et al.
7,129,509 B2   10/2006  Katzir et al.
(Continued)

FOREIGN PATENT DOCUMENTS

JP    4564312 B2     10/2010
WO   2019068162 A1   4/2019
WO   2021131771 A1   7/2021

OTHER PUBLICATIONS

WIPO, International Preliminary Report on Patentability for International Application No. PCT/IL2021/050964, May 16, 2023.
(Continued)

*Primary Examiner* — Huy Q Phan
*Assistant Examiner* — David B Frederiksen
(74) *Attorney, Agent, or Firm* — Hodgson Russ LLP

(57) ABSTRACT

Apparatus for inspecting electrical circuits including a scanner including at least one multiline Time Delay Integration (TDI) sensor having multiple parallel lines of sensor pixels, the multiple lines being separated from each other by a separation distance along a scanning axis, each of the sensor pixels having a sensor pixel dimension along the scanning axis, a linear displacer providing mutual displacement of the TDI sensor and an electrical circuit to be inspected along the scanning axis and scanning optics directing light reflected from the electrical circuit to the sensor pixels, the scanning optics defining a projection of each sensor pixel onto the electrical circuit, which projection defines the area on the electrical circuit from which light reaches each sensor pixel, each projection having a sensor pixel projection dimension along the scanning axis and an image generator constructing an image from composite output pixels of the TDI sensor.

12 Claims, 13 Drawing Sheets

(56) References Cited

U.S. PATENT DOCUMENTS

| | | | |
|---|---|---|---|
| 7,417,243 B2 | 8/2008 | Katzir et al. | |
| 8,098,372 B2 | 1/2012 | Eitan et al. | |
| 2006/0103725 A1* | 5/2006 | Brown | H04N 25/7795 |
| | | | 348/92 |
| 2010/0046853 A1* | 2/2010 | Goodnough | H04N 25/711 |
| | | | 382/275 |
| 2011/0304848 A1 | 12/2011 | Tanaka et al. | |
| 2013/0076956 A1* | 3/2013 | Nelson | H04N 1/40056 |
| | | | 348/312 |
| 2013/0077134 A1* | 3/2013 | Compton | H04N 1/40056 |
| | | | 358/482 |
| 2013/0330662 A1 | 12/2013 | Goodwin | |
| 2015/0334325 A1 | 11/2015 | Saporetti | |
| 2016/0165155 A1* | 6/2016 | Qin | H04N 25/711 |
| | | | 348/250 |
| 2018/0295300 A1* | 10/2018 | McCorkle | H04N 25/625 |
| 2021/0215619 A1* | 7/2021 | Shu | G01N 21/8901 |

OTHER PUBLICATIONS

WIPO, International Search Report for PCT/IL2021/050964, Nov. 8, 2021.

\* cited by examiner

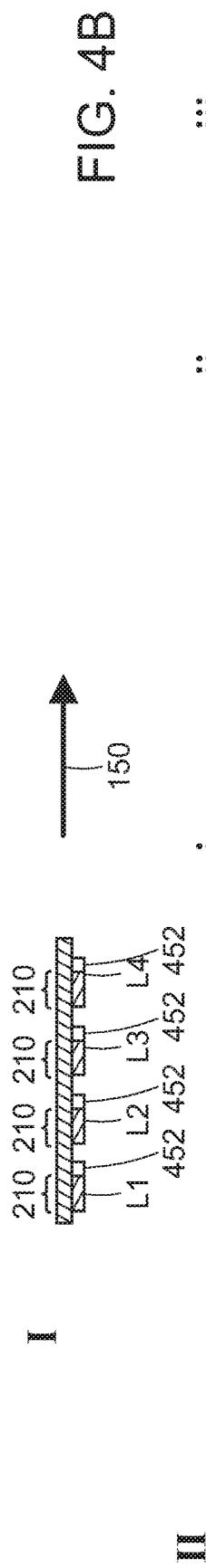

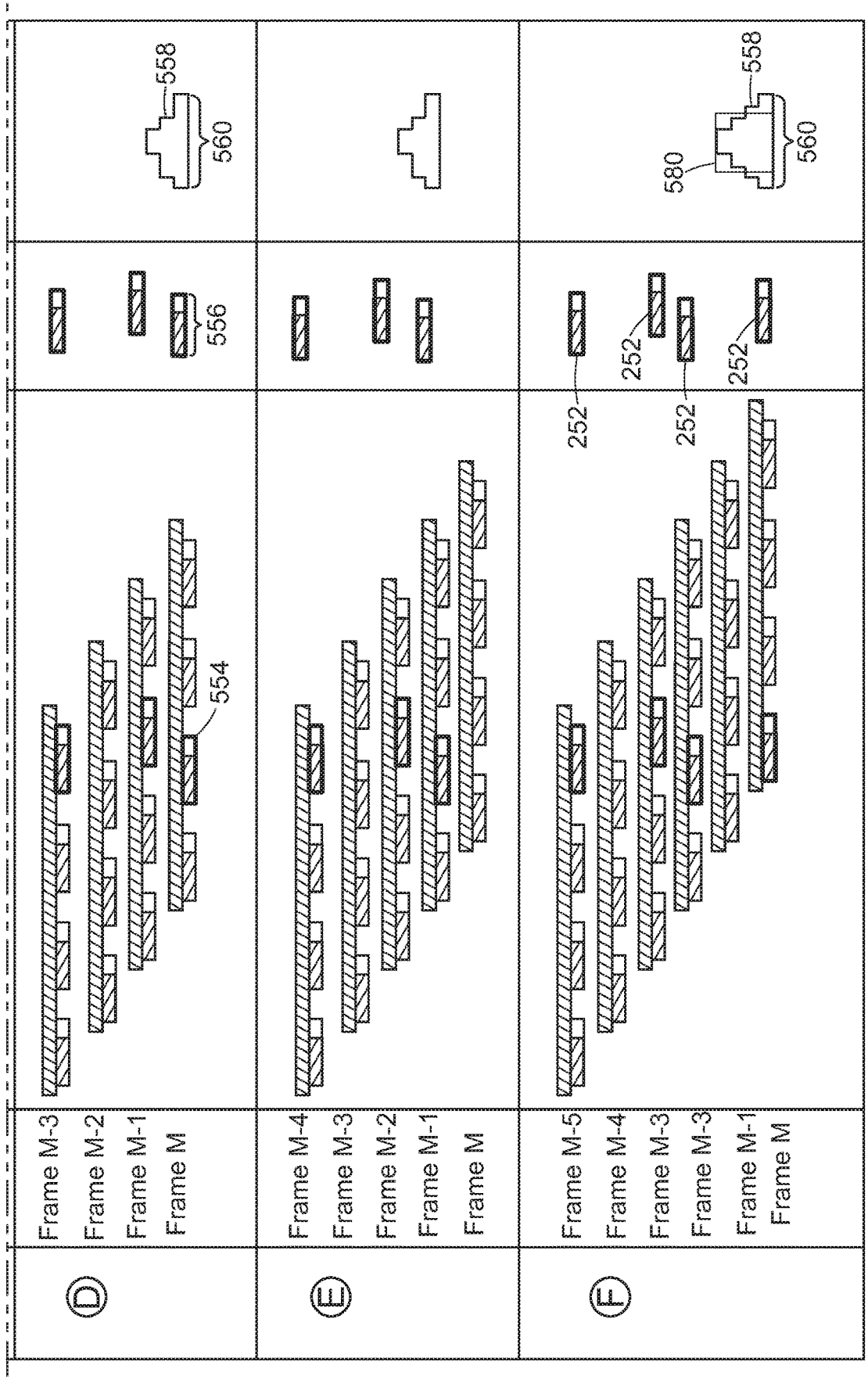

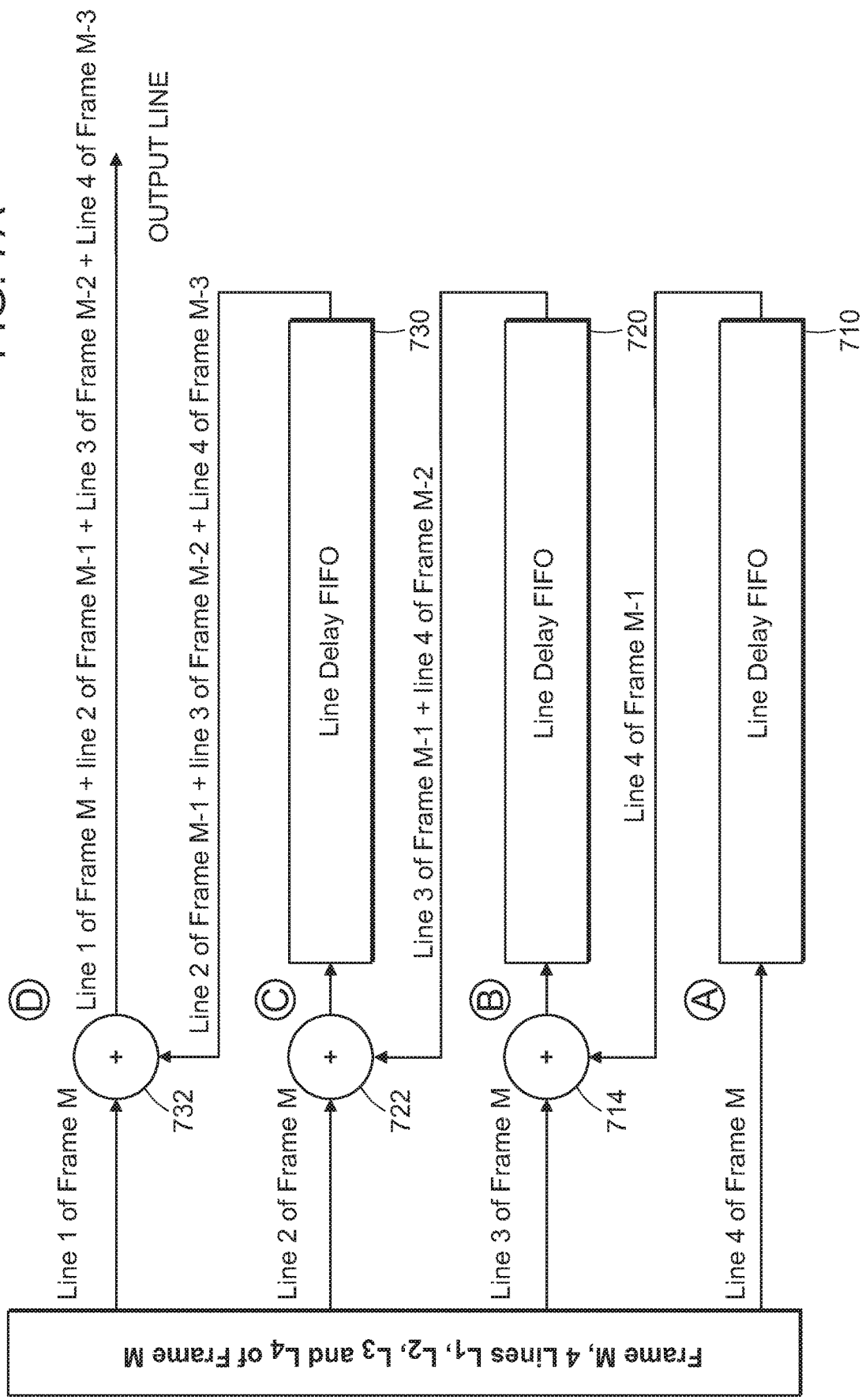

RESAMPLING WITH TDI SENSORS

REFERENCE TO RELATED APPLICATIONS

Reference is hereby made to the following U.S. patents of assignee, the contents of which are hereby incorporated by reference in their entireties: U.S. Pat. No. 7,417,243, issued Aug. 26, 2008; U.S. Pat. No. 7,129,509, issued Oct. 31, 2006; and U.S. Pat. No. 7,009,163, issued Mar. 7, 2006.

FIELD OF THE INVENTION

The present invention relates to automated inspection of electrical circuits generally.

BACKGROUND OF THE INVENTION

Various types of automated inspection equipment and methodologies are known for machine inspection of electrical circuits.

It is normally desired to inspect electrical circuits as quickly as possible in order to achieve maximum throughput of the inspection machine. The time required to inspect a given circuit by a machine employing line sensors is limited by two factors: the minimum line acquisition time of the line sensors and the maximum pixel size. The shorter the acquisition time and the larger the pixel size, the faster is the scan.

The minimum line acquisition time is an inherent characteristic of the line sensors that are employed.

The pixel size is governed by the optics of the machine and represents the degree of magnification, a smaller pixel size corresponding to a higher degree of magnification. The smaller the feature that is required to be inspected, the smaller is the maximum pixel size employed for inspection of such features. The smaller the maximum pixel size, the slower is the inspection.

Accordingly, for each given inspection task, it is desired to select the maximum pixel size that will enable inspection of the smallest feature which must be inspected.

The larger the range of selectable pixel sizes, the greater is the complexity and cost of the optics in the inspection machine.

SUMMARY OF THE INVENTION

The present invention seeks to provide improved apparatus and methodologies for inspecting electrical circuits having an enhanced range of selectable pixel sizes without the attendant complexity and cost of selectable magnification optics.

The apparatus and methodology are intended to enable inspection of electrical circuits employing Time Delay Integration (TDI) at selectable spatial resolutions, so as to optimize throughput for each inspection task, but without requiring changes in optical magnification.

There is thus provided in accordance with an embodiment of the present invention, apparatus for inspecting electrical circuits including a scanner including at least one multiline Time Delay Integration (TDI) sensor having multiple parallel lines of sensor pixels, each extending along a line axis, the multiple lines of sensor pixels being separated from each other by a separation distance along a scanning axis, perpendicular to the line axis, each of the sensor pixels having a sensor pixel dimension along the scanning axis, a linear displacer providing mutual displacement of the multiline TDI sensor and an electrical circuit to be inspected along the scanning axis and scanning optics directing light reflected from the electrical circuit to the sensor pixels, the scanning optics defining a projection of each sensor pixel onto the electrical circuit, which projection defines the area on the electrical circuit from which light reaches each sensor pixel, each the projection having a sensor pixel projection dimension along the scanning axis, the TDI sensor and the linear displacer being operative such that a distance of mutual displacement of the multiline TDI sensor and the electrical circuit to be inspected along the scanning axis during acquisition of each line thereof is greater than the sensor pixel projection dimension along the scanning axis and an image generator constructing an image from composite output pixels of the multiline TDI sensor, which image includes a plurality of the composite output pixels each having a composite image collection profile along the scanning axis, the composite image collection profile having a dimension along the scanning axis which is greater than the sensor pixel projection dimension.

The composite output pixels can each include multiple partially overlapping output pixels acquired from a plurality of the sensor pixels located at different lines of the TDI sensor, each of the output pixels acquired by each of the plurality of sensor pixels including at least an identical feature of the electrical circuit. Additionally, the multiple partially overlapping output pixels each have an output pixel projection dimension along the scanning axis which includes the sensor pixel projection dimension together with an extent to which the mutual displacement of the multiline TDI sensor and the electrical circuit to be inspected along the scanning axis during acquisition of each of the multiple parallel lines exceeds the sensor pixel projection dimension.

In accordance with an embodiment of the present invention the separation distance between the multiple parallel lines of sensor pixels is equal to an integer multiple of the sensor pixel dimension. Alternatively, the separation distance between the multiple parallel lines of sensor pixels is equal to zero.

In accordance with an embodiment of the present invention the linear displacer is a bi-directional linear displacer.

The distance of mutual displacement of the multiline TDI sensor and the electrical circuit to be inspected along the scanning axis during acquisition of each line thereof can exceed the sensor pixel projection dimension along the scanning axis by an operator selectable extent.

In accordance with an embodiment of the present invention the apparatus also includes an operator selectable mutual displacement selector configured for operator selection of the distance of mutual displacement of the multiline TDI sensor and the electrical circuit to be inspected along the scanning axis during acquisition of each line thereof.

There is also provided in accordance with another embodiment of the present invention a method for inspecting electrical circuits, the method including providing a scanner including at least one multiline Time Delay Integration (TDI) sensor having multiple parallel lines of sensor pixels, each extending along a line axis, the multiple lines of sensor pixels being separated from each other by a separation distance along a scanning axis, perpendicular to the line axis, each of the sensor pixels having a sensor pixel dimension along the scanning axis, defining a mutual displacement distance of the multiline TDI sensor and an electrical circuit to be inspected along the scanning axis during acquisition of each line of the multiline TDI sensor, mutually displacing, by the mutual displacement distance, the multiline TDI sensor and the electrical circuit to be inspected along the scanning axis, directing, using scanning optics, light reflected from the electrical circuit to the sensor pixels, the scanning optics defining a projection of each sensor pixel onto the electrical circuit, which projection defines the area on the electrical circuit from which light reaches each sensor pixel, each the projection having a sensor pixel projection dimension along the scanning axis, the mutual displacement distance being greater than the sensor pixel projection dimension along the scanning axis and constructing an image from composite output pixels of the multiline TDI sensor, the image including a plurality of the composite output pixels, each of the composite output pixels having a composite image collection profile along the scanning axis, the composite image collection profile having a composite image collection profile dimension along the scanning axis which is greater than the sensor pixel projection dimension.

The constructing an image can include, for each of the composite output pixels, acquiring multiple partially overlapping output pixels from a plurality of the sensor pixels located at different lines of the TDI sensor, each of the output pixels acquired by each of the plurality of sensor pixels including at least an identical feature of the electrical circuit and combining the multiple partially overlapping output pixels into the composite output pixel.

In accordance with an embodiment of the present invention the defining a mutual displacement distance includes selecting, by an operator, the mutual displacement distance from multiple possible displacement distances.

The method also can include generating square pixels from the output pixels, the generating square pixels including generating an interpolated output pixel by interpolating the output pixels in a direction of the line axis and resizing the interpolated output pixel to have a dimension along the line axis equal to the mutual displacement distance.

BRIEF DESCRIPTION OF THE DRAWINGS

The present invention will be understood and appreciated more fully from the following detailed description, taken in conjunction with the drawings in which:

FIGS. 4A & 4B are, respectively, a Time Delay Integration (TDI) interconnection diagram and a composite diagram illustrating the structure and functionality representing operation of apparatus for automated inspection of electrical circuits in accordance with an embodiment of the present invention;

FIGS. 7A & 7B are, respectively, a TDI interconnection diagram and a composite diagram illustrating the structure and functionality representing operation of apparatus for automated inspection of electrical circuits in accordance with still another embodiment of the present invention.

DETAILED DESCRIPTION OF EMBODIMENTS OF THE INVENTION

Figure 1:
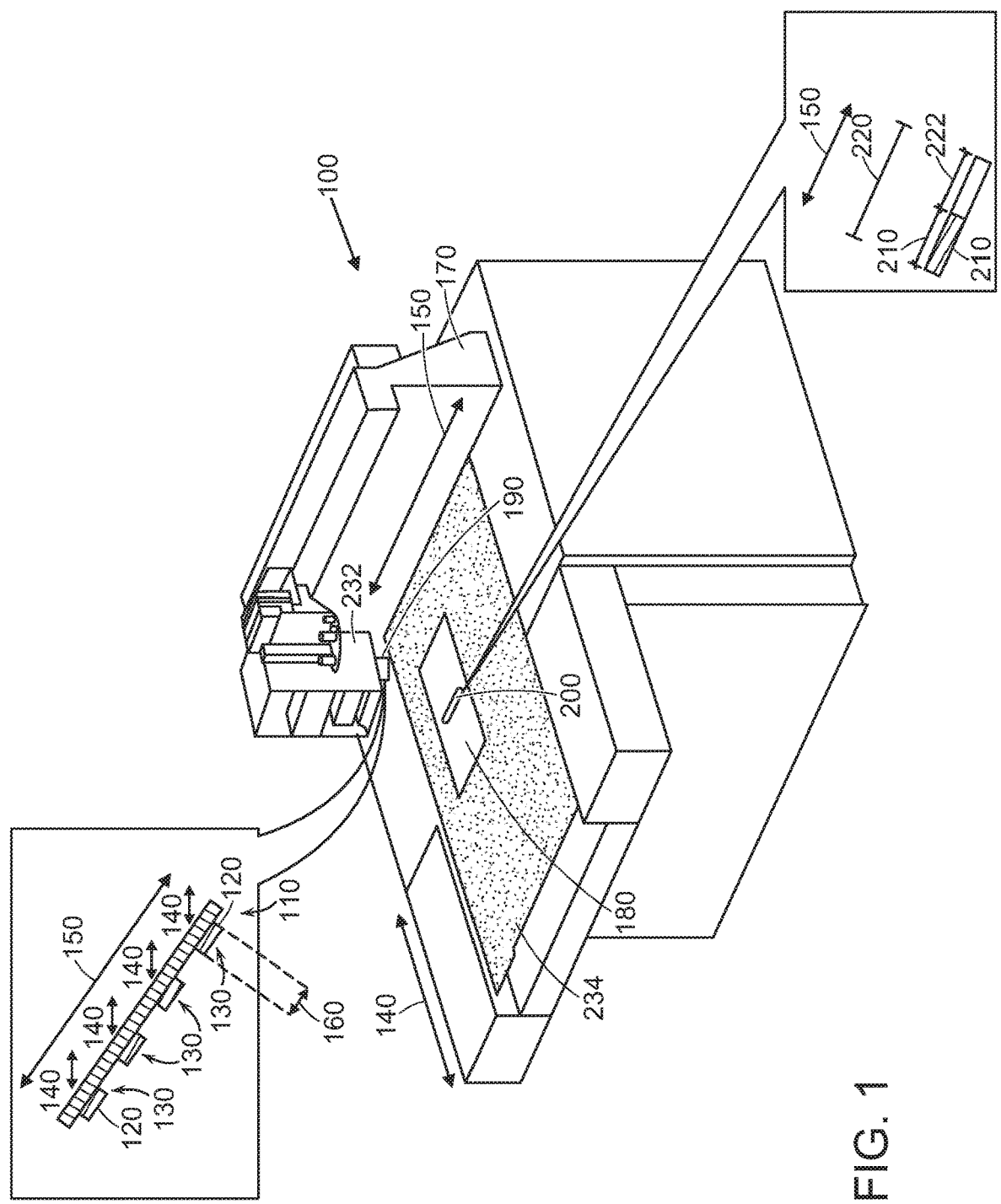
FIG. 1 is a simplified partially pictorial, partially conceptual, illustration of apparatus for automated inspection of electrical circuits in accordance with an embodiment of the present invention.

The present invention seeks to provide apparatus and methodologies for automated inspection of electrical circuits employing a Time Delay Integration (TDI) sensor, which are able to realize enhanced automated inspection throughput at a variety of different inspection resolutions without changing the optical magnification. The apparatus is described hereinbelow in detail with reference to FIGS. 1-8. As described in detail below and illustrated in the drawings, the apparatus for inspecting electrical circuits employs a scanner 100 including:

at least one multiline TDI sensor 110 having at least two lines 120 and multiple parallel lines 120 of sensor pixels 130, each extending along a line axis 140, the multiple lines 120 of sensor pixels 130 being separated from each other along a scanning axis 150, perpendicular to the line axis 140, each of the sensor pixels 130 having a sensor pixel dimension 160 along the scanning axis 150;

a linear displacer 170 providing mutual displacement of the multiline TDI sensor 110 and an electrical circuit to be inspected 180 along the scanning axis 150;

scanning optics 190 directing light reflected from the electrical circuit 180 to the sensor pixels 130, the scanning optics 190 defining a projection 200 of each sensor pixel 130 onto the electrical circuit 180, which projection 200 defines the area on the electrical circuit 180 from which light reaches each sensor pixel 130, each projection having a sensor pixel projection dimension 210 along the scanning axis 150, the TDI sensor 110 and the linear displacer 170 being operative such that the distance 220 of mutual displacement of the multiline TDI sensor 110 and an electrical circuit to be inspected 180 along the scanning axis 150 during acquisition of each line thereof is greater than the sensor pixel projection dimension 210 along the scanning axis 150 by a selectable extent 222, and an image generator 230, which may be implemented in computer software or dedicated hardware, constructing an image by generating composite output pixels from outputs of the multiline TDI sensor 110.

The image generator 230 is coupled to the scanner 100. The image generator 230 typically comprises or is run using a programmable processor, which is programmed in software and/or firmware to carry out the functions that are described herein, along with suitable digital and/or analog interfaces for connection to the other elements of scanner 100. Alternatively or additionally, image generator 230 comprises hard-wired and/or programmable hardware logic circuits, which carry out at least some of the functions of the image generator 230. Although image generator 230 is shown in FIG. 1, for the sake of simplicity, as a single unit, in practice the image generator 230 may comprise multiple, interconnected units, with suitable interfaces for receiving and outputting the signals that are illustrated in the figures and are described in the text. Program code or instructions for the image generator 230 to implement various methods and functions disclosed herein may be stored in readable storage media.

It is appreciated that, while in the illustrated embodiments shown the separation distance between multiple lines 120 of sensor pixels 130 of multiline TDI sensor 110 along scanning axis 150 is equal to the sensor pixel dimension 160, the separation distance may be any integer value, including zero, times the sensor pixel dimension 160.

Referring specifically to FIG. 1, the scanner 100 can include one or more optical heads 232, mounted in spaced relation to a table 234 onto which the electrical circuit 180 is supported. One such optical head 232 is shown in FIG. 1 and can include multiline TDI sensor 110. An example of a multiline TDI sensor 110 is a Piranha XL CMOS TDI sensor, commercially available from Teledyne DALSA of Waterloo, Ontario, Canada.

Electrical circuit 180 may be, by way of example, printed circuits, wafers or wafer dies, assembled PCBs, flat panel displays and solar energy wafers.

It is appreciated that the continuous relative motion of the electrical circuit 180 with respect to optical head 232 may be realized by motion of optical head 232 along scanning axis 150, while electrical circuit 180 remains stationary. Alternatively, such continuous relative motion may be by way of motion of electrical circuit 180 with respect to a stationary optical head 232 or by way of motion of both electrical circuit 180 and optical head 232 with respect to each other. It is appreciated that although the operation of the inspection system is described hereinbelow with respect to motion of optical head 232 along scanning axis 150 relative to stationary electrical circuit 180, the principles of operation may be correspondingly applied to other modes of relative motion therebetween. It is further appreciated that the relative motion of electrical circuit 180 with respect to optical head 232 may proceed in either direction along scanning axis 150, and typically alternates back and forth between directions during scanning of different portions of electrical circuit 180.

Each optical head 232 can include scanning optics 190 directing light reflected from the electrical circuit 180 to the sensor pixels 130, the scanning optics 190 defining a projection 200 of each sensor pixel 130 onto the electrical circuit 180, which projection 200 defines the area on the electrical circuit 180 from which light reaches each sensor pixel 130, each projection having a sensor pixel projection dimension 210 along the scanning axis 150.

It is a particular feature of an embodiment of the present invention that the TDI sensor 110 and the linear displacer 170 can be operative to perform continuous scanning of the electrical circuit 180 in a manner such that the distance of mutual displacement of the multiline TDI sensor 110 and an electrical circuit to be inspected 180 along the scanning axis 150 during acquisition of each line thereof, also termed the output pixel projection dimension 220, is greater than the sensor pixel projection dimension 210 along the scanning axis 150.

Image generator 230 generates composite output pixels 250 from outputs of the multiline TDI sensor 110 and constructs an image (not shown).

Referring additionally to FIGS. 3, 4B, 5B, 6B and 7B, the composite output pixels 250 each have a composite image collection profile, which combines multiple partially overlapping output pixels 252 corresponding to a plurality of sensor pixels 130 located at different lines 120 of the TDI sensor 110. In embodiments described hereinbelow with reference to FIGS. 4A-7B, each of the output pixels 252 includes at least an identical feature of the electrical circuit 180.

The multiple partially overlapping output pixels 252 each can have an output pixel projection dimension 220 along the scanning axis 150 which includes the sensor pixel projection dimension 210 together with the extent 222 to which the mutual displacement of the multiline TDI sensor and the electrical circuit to be inspected along the scanning axis 150 during acquisition of each of the multiple parallel lines exceeds the sensor pixel projection dimension 210.

It is appreciated that selecting a mutual displacement that is larger than the sensor pixel projection dimension 210 typically results in a rectangular output pixel, having a length equal to output pixel projection dimension 220 along the scanning axis 150 and having a width equal to the sensor pixel projection dimension 210 along the line axis. It is appreciated that, while in the illustrated embodiments, which are not drawn to scale, the output pixel is a rectangular output pixel, a square pixel may be generated by interpolating the output pixel, in the direction of the line axis, and resizing, according to the appropriate ratio, to have a dimension along the line axis equal to the output pixel projection dimension 220.

Each of the composite output pixels 250 has an output pixel composite image collection profile dimension along the scanning axis 150, which output pixel composite image collection profile dimension is greater than the sensor pixel projection dimension 210.

Figure 2:
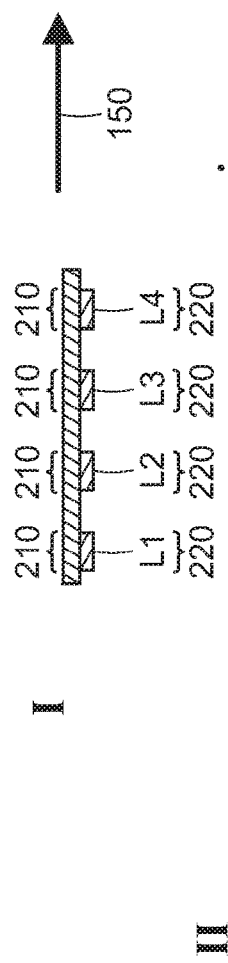
FIG. 2 is a composite diagram illustrating the structure and functionality representing operation of apparatus for automated inspection of electrical circuits operating in accordance with the prior art.

In order to clearly describe the difference between embodiments of the invention and the prior art, reference is now made to FIG. 2, which is a composite diagram illustrating the structure and functionality of automated inspection of electrical circuits in accordance with the prior art, in which an output pixel composite image collection profile dimension 280 along the scanning axis 150 is equal to the sensor pixel projection dimension 210.

Turning now to FIG. 2, there is seen at I, a simplified cross sectional illustration of multiline TDI sensor 110, showing lines L1, L2, L3 and L4 of a prior art multiline TDI sensor 110.

At II, for each of stages A, B, C and D, there are shown:
i. reproductions of a simplified cross-sectional illustration of multiline TDI sensor 110 indicating in bold outlines 336 the outputs of which of the sensor pixels 130 are included in the image data at that stage;
ii. illustrations of the sensor pixel projection dimensions 210 of the collected sensor pixels 130, which are included in the image data at that stage. It is noted that pixels from every second frame are included in the image data;
iii. illustrations of a collection profile 340 of the image data at that stage, the width of the collection profile 340 representing the output pixel composite image collection profile dimension 280 and the height of the composite image collection profile 340 being proportional to the number of sensor pixels 130 contributing to the composite image data at that stage.

It is noted that the composite image has a composite image collection profile dimension 280, along the scanning axis 150, which is equal to the sensor pixel projection dimension 210 and exhibits relatively low blur. As will be understood below, the various embodiments of the present invention, illustrated in FIGS. 3-7B, illustrate composite image collection profile dimensions that are greater than the sensor pixel projection dimension 210 and the embodiment of the invention which is illustrated in FIGS. 7A and 7B illustrates a composite image collection profile dimension that is the same as the output pixel projection dimension 220.

Figure 3:
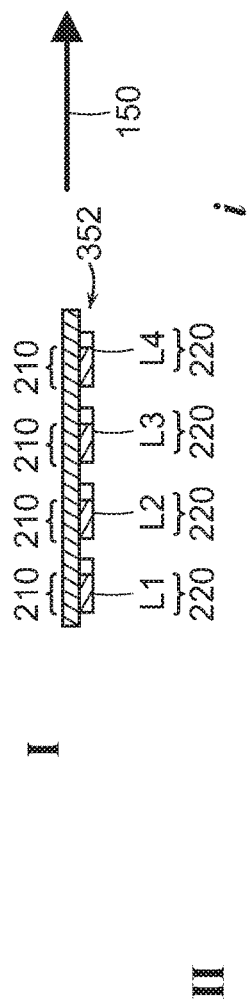
FIG. 3 is a composite diagram illustrating the structure and functionality representing operation of apparatus for automated inspection of electrical circuits operating in accordance with an embodiment of the present invention.

Reference is now made to FIG. 3, which is a composite diagram illustrating the structure and functionality representing operation of the apparatus for automated inspection of electrical circuits operating in accordance with an embodiment of the present invention.

As seen in FIG. 3, there is seen at I, a simplified cross-sectional illustration of multiline TDI sensor 110, showing lines of a multiline TDI sensor 110, respectively designated by designations L1, L2, L3 and L4.

There is also shown for each of lines L1-L4, an extent 352 of the mutual displacement of the multiline TDI sensor 110 and the electrical circuit to be inspected 180 along the scanning axis 150, during acquisition of each line, beyond sensor pixel projection dimension 210 along the scanning axis 150. In this embodiment, the extent 352 of the mutual displacement of the multiline TDI sensor 110 and the electrical circuit to be inspected 180 along the scanning axis 150 during acquisition of each line 120 beyond sensor pixel projection dimension 210 in this embodiment is equal to 50% of the sensor pixel projection dimension 210.

At II, for each of stages A, B, C and D, there are shown:
i. reproductions of a simplified cross-sectional illustration of multiline TDI sensor 110 indicating in bold outlines 354 the output pixels 252 corresponding to those sensor pixels 130 which are included in the image data at that stage. It is noted that here the output pixels 252 each have an output pixel projection dimension 356, which is comprised of sensor pixel projection dimension 210 together with the extent 352 of the mutual displacement of the multiline TDI sensor 110 and the electrical circuit to be inspected 180 along the scanning axis 150, during acquisition of each line 120, beyond sensor pixel projection dimension 210.
ii. illustrations of the output pixel projection dimensions 356 of the sensor pixels 130 which are included in the image data at that stage. It is seen that pixels from every second frame are included in the image data.
iii. illustrations of a composite image collection profile 360 of the image data at that stage, the width of the composite image collection profile 360 representing a composite image collection profile dimension 370 and the height of the composite image collection profile 360 indicating the number of sensor pixels 130 contributing to the image data at that stage.

The resulting image is characterized by having a relatively large pixel size, greater than that provided by the prior art TDI arrangement represented by FIG. 2, that exhibits relatively high blur, greater than the blur in the image produced by the prior art TDI arrangement illustrated in FIG. 2, due to the width of the composite image collection profile 360, namely the composite image collection profile dimension 370.

Comparing FIGS. 2 and 3, it is appreciated that in the embodiment of FIG. 3, image data from every second frame is included in the composite image, similarly to conventional TDI image construction as described above with reference to FIG. 2. As distinct from the prior art TDI arrangement illustrated in FIG. 2, the composite image collection profile dimension 370 is 4.5 times the sensor pixel projection dimension 210.

An additional measure of imaging performance is a line sensor percentage, which is the percentage of the line sensors which contribute to the collected image data at any given location along the composite image collection profile, measured at a location, indicated by reference number 380, having an area located at the center of the composite image collection profile 360, with a width equal to the output pixel projection dimension 356 and a height equal to the number of lines 120 on multiline TDI sensor 110. Thus, the line sensor percentage, measured at location 380, is a percentage of the area of the composite image collection profile 360 located within location 380 to the entire area of location 380.

In the embodiment shown in FIG. 3, the line sensor percentage is 33%.

Figure 4A:
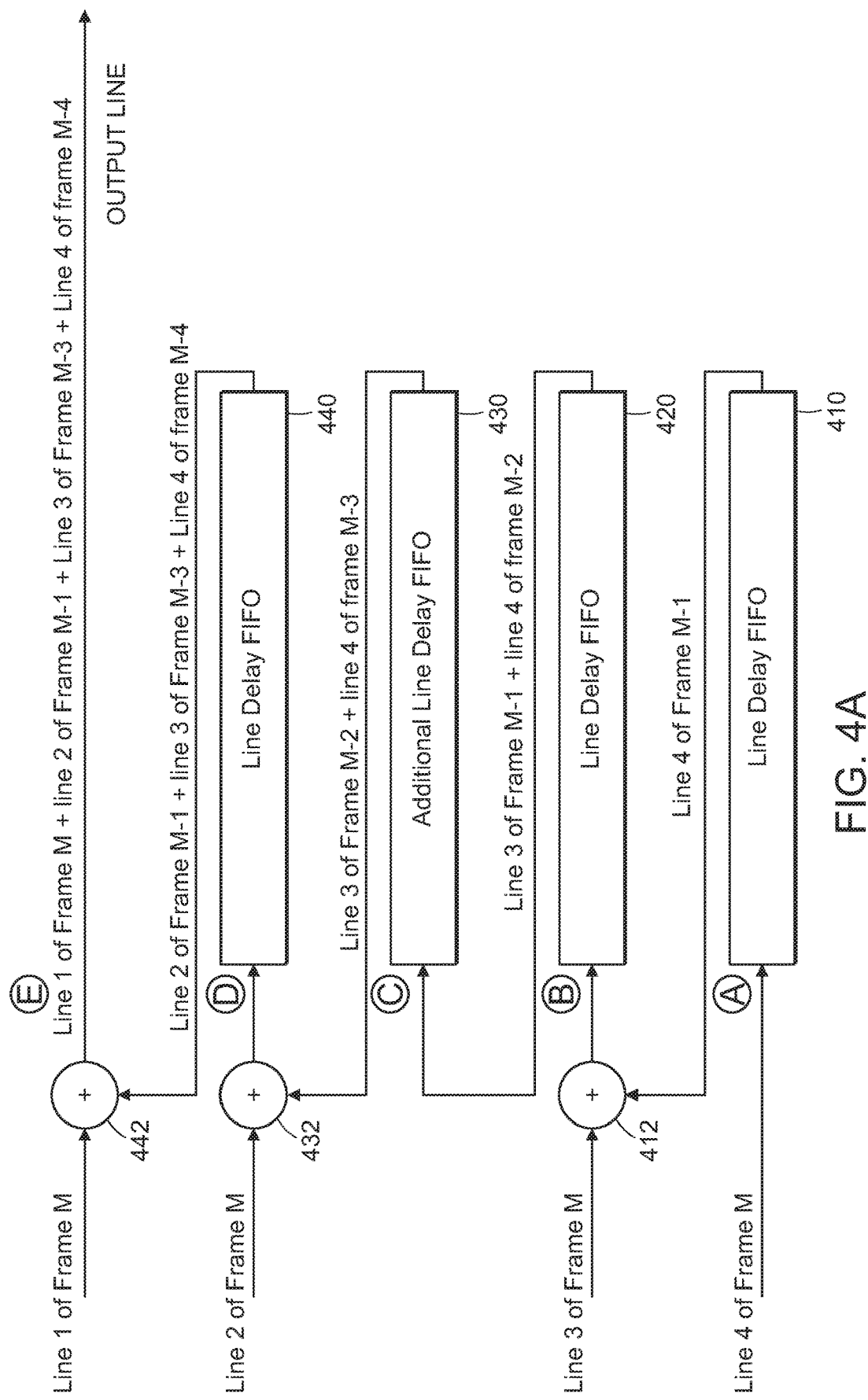

Reference is now made to FIGS. 4A & 4B, which are, respectively, a TDI interconnection diagram and a composite diagram illustrating the structure and functionality for automated inspection of electrical circuits operating in accordance with an embodiment of the present invention. In this embodiment, the distance of mutual displacement of the multiline TDI sensor 110 and the electrical circuit to be inspected 180 along the scanning axis 150 during acquisition of each line 120 thereof is 1.5 times the sensor pixel projection dimension 210 along the scanning axis 150.

As seen in FIG. 4A, at stage A, line 4 of Frame M of the output of multiline TDI sensor 110 is supplied to a 1-Frame FIFO Line Delay circuit 410. The delayed output from FIFO Line Delay circuit 410, designated as Line 4 of Frame M-1, is supplied to an adder 412, which adds it to line 3 of Frame M. At stage B, the summed output of adder 412 is supplied to a further 1-Frame FIFO Line Delay circuit 420. The delayed output from FIFO Line Delay circuit 420, designated as Line 3 of Frame M-1+Line 4 of Frame M-2, is supplied, at stage C, to an additional 1-Frame FIFO Line Delay circuit 430. The delayed output from FIFO Line Delay circuit 430, designated as Line 3 of Frame M-2+Line 4 of Frame M-3, is supplied to an additional adder 432, which adds it to line 2 of Frame M.

At stage D, the summed output of adder 432 is supplied to a further 1-Frame FIFO Line Delay circuit 440. The delayed output from FIFO Line Delay circuit 440, designated as Line 2 of Frame M-1+Line 3 of Frame M-3+Line 4 of Frame M-4, is supplied to a further adder 442, which adds it to line 1 of Frame M.

At stage E, the summed output of adder 442, designated as Line 1 of Frame M+Line 2 of Frame M-1+Line 3 of Frame M-3+line 4 of Frame M-4, is supplied as a TDI output.

Turning now to FIG. 4B, there is seen at I, a simplified cross-sectional representation of multiline TDI sensor 110, showing lines 1, 2, 3 and 4 of a multiline TDI sensor 110, respectively designated by designations L1, L2, L3 and L4.

There is also shown for each of lines L1-L4, an extent 452 of the mutual displacement of the multiline TDI sensor 110 and the electrical circuit to be inspected 180 along the scanning axis 150 during acquisition of each line beyond the sensor pixel projection dimension 210 of each line along the scanning axis 150. In this embodiment, the extent 452 of the mutual displacement of the multiline TDI sensor 110 and the electrical circuit to be inspected 180 along the scanning axis 150 during acquisition of each line 120 beyond sensor pixel projection dimension 210 is equal to 50% of the sensor pixel projection dimension 210.

At II, for each of stages A, B, C, D and E, there are shown:
i. reproductions of a simplified cross-sectional illustration of multiline TDI sensor 110 indicating in bold outlines 454 the output pixels 252 corresponding to those sensor pixels 130 which are included in the image data at that stage. It is noted that in this embodiment the output pixels 252 each have an output pixel projection dimension 456, which is comprised of sensor pixel projection dimension 210 together with the extent 452 of the mutual displacement of the multiline TDI sensor 110 and the electrical circuit to be inspected 180 along the scanning axis 150 during acquisition of each line 120 beyond sensor pixel projection dimension 210.

ii. illustrations of the output pixel projection dimensions 456 of the sensor pixels 130 which are included in the image data at that stage.

iii. illustrations of a composite image collection profile 458 of the image data at that stage, the width of composite image collection profile 458 representing a composite image collection profile dimension 460 and the height of the composite image collection profile 458 indicating the number of sensor pixels 130 contributing to the image data at that stage.

The resulting composite image collection profile 458 is characterized by having a relatively small composite image pixel collection profile dimension 460, greater than that provided by the prior art TDI arrangement represented by FIG. 2 and smaller than that provided by the TDI arrangement in the embodiment of FIG. 3, and exhibits relatively lower blur than the image produced by the TDI arrangement illustrated in FIG. 3, due to the relatively smaller width of the composite image collection profile dimension 460 of the embodiment of FIGS. 4A & 4B as compared with the composite image collection profile dimension 370 of the embodiment of FIG. 3.

Comparing FIGS. 2, 3 and 4B, it is appreciated that in the embodiment of FIG. 4B, image data from all of the frames is not included in the composite image. Specifically in the illustrated embodiment, image data from Frame M-2 at stage E is not employed, because the image data of only four frames can be used and eliminating the image data from Frame M-2, as opposed to that from any of the other frames, yields the narrowest composite image collection profile dimension.

Specifically comparing FIGS. 3 and 4B, it is appreciated that in the embodiment of FIG. 3, image data from every second one of the frames is included in the image, however in FIG. 4B, image data from only selected frames is included in the image. Only output pixels 252 which all include at least an identical feature of the electrical circuit 180 are included. Specifically in the illustrated embodiment of FIGS. 4A & 4B, image data from Frame M-2 at stage E is not employed since employing such image data would render the composite image collection profile 458 wider and result in more blur.

Quantitatively, the composite image collection profile dimension 370 in FIG. 3 equals 4.5 times sensor pixel projection dimension 210 which also equals 3 times output pixel projection dimension 356. In the embodiment of FIGS. 4A & 4B, the width of the composite image collection profile 458, i.e. the composite image collection profile dimension 460, is 2.5 times the sensor pixel projection dimension 210, or 1.66 times the output pixel projection dimension 456.

The height of the composite image collection profile 458 at every given image location represents the number of times this image location appears in a pixel included in the composite image collection profile. In the illustrated embodiments, in which multiline TDI sensor 110 includes four lines 120 of sensor pixels 130, this number can be between 1 and 4. "1" means only one line 120 of pixels 130 includes this image location and "4" means that the image location appears in all four lines 120 of pixels 130.

It is appreciated that multiline TDI sensor 110 may include fewer or more than four lines 120 of sensor pixels 130, in which embodiments the maximum height value of the composite image is the number of lines 120 of sensor pixels 130. It is further appreciated that, while in the illustrated embodiments shown, output pixels 252 from each of lines 120 are included in the composite image, not all lines 120 of sensor pixels 130 of multiline TDI sensor 110 need be included in the composite image. Additionally, it is appreciated that, while in the illustrated embodiments shown the number of output pixels 252 that are selected for inclusion in the composite image equals the number of lines 120, the composite image may include fewer or more output pixels 252.

In the illustrated embodiment shown in FIG. 3, the height of composite image collection profile 360 does not go above 2, which means that each image location is sampled at most twice in the composite image collection profile 360. The composite image collection profile dimension 370 equals 4.5 times sensor pixel projection dimension 160 which also equals 3 times output pixel projection dimension 356. The maximum height of composite image collection profile 458 in FIG. 4B is 4, which means that there is at least one image location that is acquired by all 4 pixels.

The composite image collection profile 458 of the embodiment of FIGS. 4A & 4B is also more concise than the composite image collection profile 360 of the embodiment of FIG. 3, having a composite image collection profile dimension 460 of only 2.5 times the sensor pixel projection dimension 210, which is 0.56 (5/9) of the comparable composite image collection profile dimension 370 of the embodiment of FIG. 3.

An additional measure of imaging performance is the line sensor percentage, which is the percentage of the line sensors which contribute to the collected image data at any given location along the composite image collection profile, measured at a location, indicated by reference number 480, having an area located at the center of the composite image collection profile 458, with a width equal to the output pixel projection dimension 456 and a height equal to the number of lines 120 on multiline TDI sensor 110. Thus, the line sensor percentage, measured at location 480, is a percentage of the area of the composite image collection profile 458 located within location 480 to the entire area of location 480.

In the prior art represented in FIG. 2, where the sensor pixel projection dimension 210 is equal to the output pixel projection dimension 220 and equal to the composite image collection profile dimension 280, the line sensor percentage is 100%, the height of the composite image collection profile is a constant 4, and the composite image collection profile dimension 280 is small.

In the embodiment of FIGS. 4A & 4B, the line sensor percentage is 83% and, as noted above, in the embodiment of FIG. 3 the line sensor percentage is 33%, demonstrating the advantage of the embodiment of FIGS. 4A & 4B over the methodology of FIG. 3.

Figure 5A:
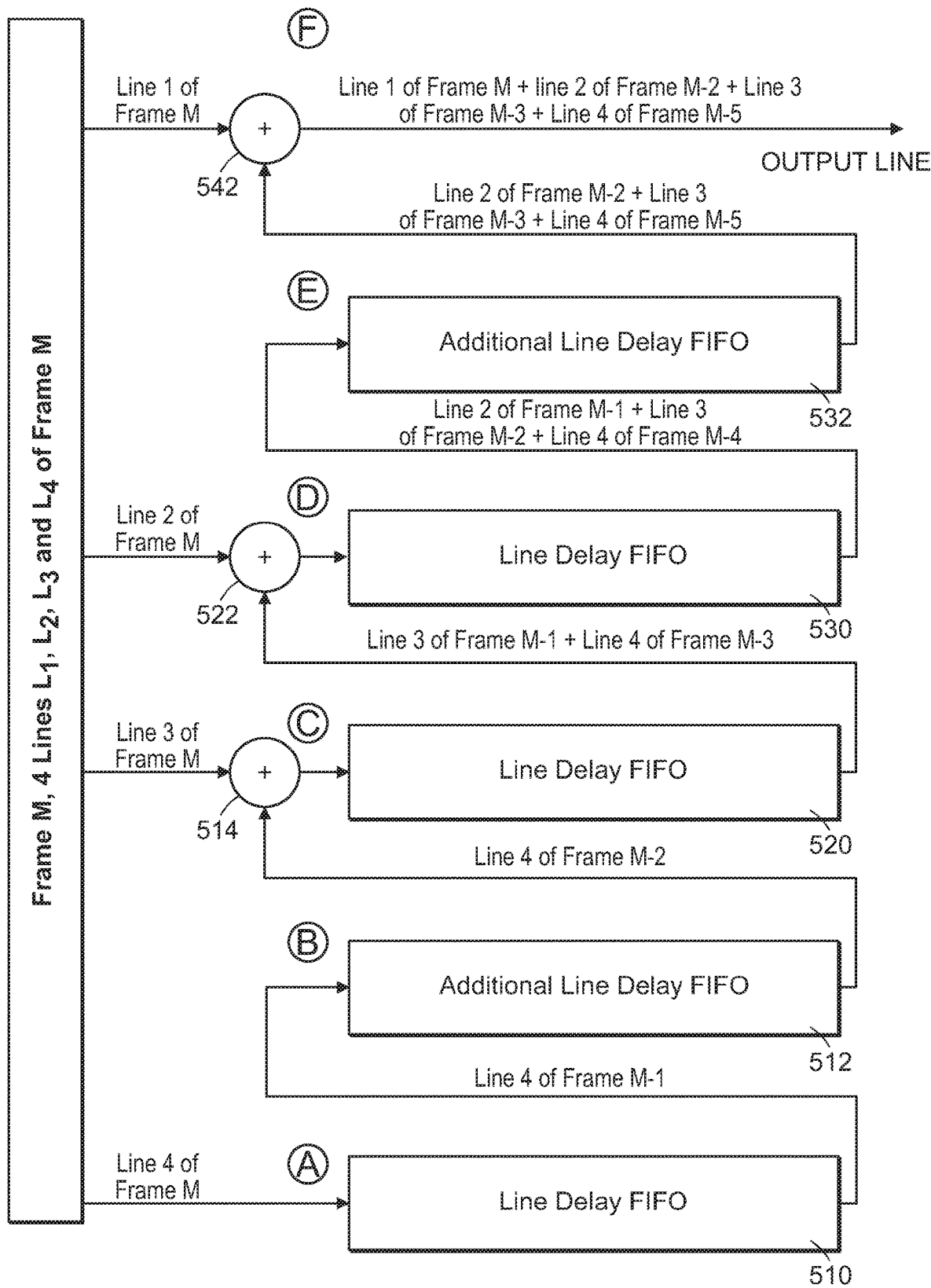
FIGS. 5A & 5B are, respectively, a TDI interconnection diagram and a composite diagram illustrating the structure and functionality representing operation of apparatus for automated inspection of electrical circuits in accordance with another embodiment of the present invention.
Figure 5B:
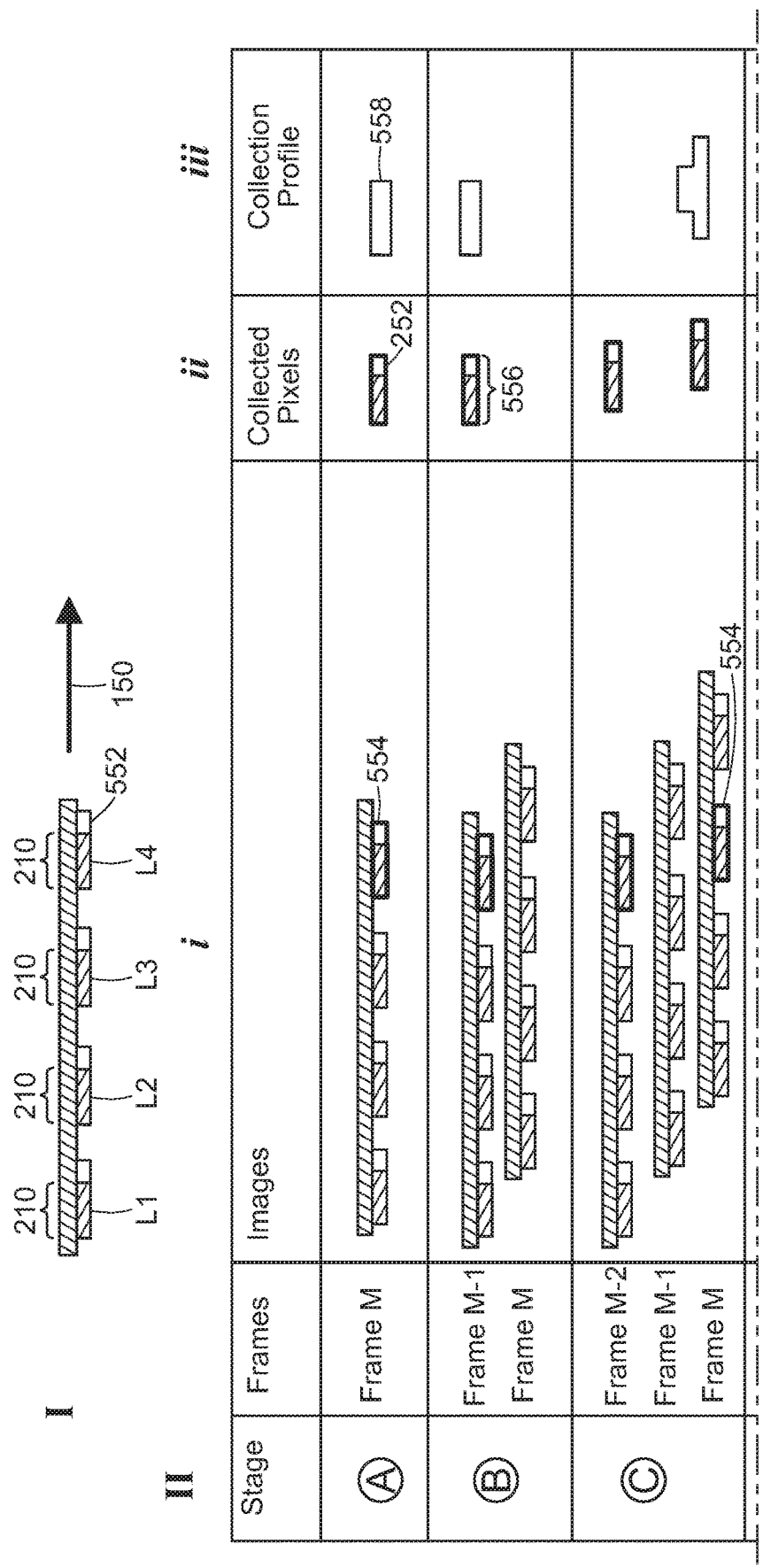

Reference is now made to FIGS. 5A & 5B, which are, respectively, a TDI interconnection diagram and a composite diagram illustrating the structure and functionality for automated inspection of electrical circuits operating in accordance with another embodiment of the present invention. In this embodiment, the distance of mutual displacement of the multiline TDI sensor 110 and the electrical circuit to be inspected 180 along the scanning axis 150 during acquisition of each line 120 thereof is 1.25 times the sensor pixel projection dimension 210 along the scanning axis 150.

As seen in FIG. 5A, at stage A, line 4 of Frame M of the output of multiline TDI sensor 110 is supplied to a 1-Frame FIFO Line Delay circuit 510. At stage B, the delayed output from FIFO Line Delay circuit 510, designated as Line 4 of Frame M-1, is supplied to a further 1-Frame FIFO Line Delay circuit 512. The output of 1-Frame FIFO Line Delay circuit 512, designated as Line 4 of Frame M-2, is supplied to an adder 514, which adds it to line 3 of Frame M. At stage C, the summed output of adder 514 is supplied to a further 1-Frame FIFO Line Delay circuit 520. The delayed output from FIFO Line Delay circuit 520, designated as Line 3 of Frame M-1+Line 4 of Frame M-3, is supplied to an adder 522. At stage D, the output of adder 522 is supplied to an additional 1-Frame FIFO Line Delay circuit 530. The delayed output from FIFO Line Delay circuit 530, designated as Line 2 of Frame M-1+Line 3 of Frame M-2+Line 4 of Frame M-4, is supplied to a further 1-Frame FIFO Line Delay circuit 532 at Stage E. The output of 1-Frame FIFO Line Delay circuit 532 is supplied to an additional adder 542, which adds it to line 1 of Frame M.

At stage F, the summed output of adder 542, designated as Line 1 of Frame M+Line 2 of Frame M-2+Line 3 of Frame M-3+Line 4 of Frame M-5, is supplied as a TDI output.

Turning now to FIG. 5B, there is seen at I, a simplified cross-sectional representation of multiline TDI sensor 110, showing lines 1, 2, 3 and 4 of a multiline TDI sensor 110, respectively designated by designations L1, L2, L3 and L4.

There is also shown for each of lines L1-L4, the extent 552 of the mutual displacement of the multiline TDI sensor 110 and the electrical circuit to be inspected 180 along the scanning axis 150 during acquisition of each line beyond the sensor pixel projection dimension 210 of each line along the scanning axis 150. In this embodiment, the extent 552 of the mutual displacement of the multiline TDI sensor 110 and the electrical circuit to be inspected 180 along the scanning axis 150 during acquisition of each line 120 beyond sensor pixel projection dimension 210 in this embodiment is equal to 25% of the sensor pixel projection dimension 210.

At II, for each of stages A, B, C, D, E and F, there are shown:
i. reproductions of a simplified cross-sectional illustration of multiline TDI sensor 110 indicating in bold outlines 554 the output pixels 252 corresponding to those sensor pixels 130 which are included in the image data at that stage. It is noted that the output pixels 252 each have an output pixel projection dimension 556, which is comprised of sensor pixel projection dimension 210 together with the extent 552 of the mutual displacement of the multiline TDI sensor 110 and the electrical circuit to be inspected 180 along the scanning axis 150 during acquisition of each line 120 beyond sensor pixel projection dimension 210.
ii. illustrations of the output pixel projection dimensions 556 of the sensor pixels 130 which are included in the image data at that stage.
iii. illustrations of a composite image collection profile 558 of the image data at that stage, the width of the composite image collection profile 558 representing a composite image collection profile dimension 560 and the height of the composite image collection profile 558 indicating the number of sensor pixels 130 contributing to the image data at that stage.

The resulting composite image pixel collection profile dimension 560 can be compared to the composite image collection profile dimension 280 of the prior art TDI arrangement shown in FIG. 2 and to a composite image collection profile dimension produced by using the methodology of FIG. 3, namely, where every 2$^{nd}$ frame is used, together with an output pixel projection dimension equal to output pixel projection dimension 556 of FIGS. 5A & 5B, which is 1.25 times the sensor pixel projection dimension 210.

The composite image collection profile 558 of the embodiment of FIGS. 5A & 5B is characterized by having a relatively small composite image pixel collection profile dimension 560, greater than that provided by the prior art TDI arrangement represented by FIG. 2, but smaller than that provided by the TDI arrangement in the methodology of the embodiment of FIG. 3, and exhibits relatively lower blur than the image produced by the TDI arrangement illustrated in FIG. 3, due to the relatively smaller composite image collection profile dimension 560 of the embodiment of FIGS. 5A & 5B as compared with what would have been the composite image collection profile dimension 370 of the embodiment of FIG. 3, had an output pixel projection dimension to sensor pixel projection dimension ratio of 1.25 been used.

Comparing FIGS. 2, 3 and 5B, it is appreciated that in the embodiment of FIG. 5B, image data from all of the frames is not included in the image. Specifically in the illustrated embodiment, image data from Frames M-1 and M-4 at stage F is not employed, because the image data of only four frames can be used and eliminating the image data from Frames M-1 and M-4, as opposed to that from any of the other frames, yields the narrowest composite image collection profile dimension 560.

Specifically comparing FIGS. 3 and 5B, it is appreciated that in the embodiment of FIG. 3, image data from every second one of the frames is included in the image, however in FIG. 5B, image data from only selected frames is included in the image. Only output pixels which all include at least an identical feature of the electrical circuit 180 are included. Specifically in the illustrated embodiment of FIGS. 5A & 5B, image data from Frames M-1 and M-4 is not employed since employing such image data would render the composite image collection profile 558 wider and result in more blur.

Quantitatively, the composite image collection profile dimension 370 in the embodiment of FIG. 3, which would have been realized by using an output pixel projection dimension to sensor pixel projection dimension ratio of 1.25, instead of an output pixel projection dimension to sensor pixel projection dimension ratio of 1.5 used in FIG. 3, is 2.75 times the sensor pixel projection dimension 210, or 2.2 times the output pixel projection dimension 556. In the embodiment of FIGS. 5A & 5B, the width of the composite image collection profile 558, i.e. the composite image collection profile dimension 560, is 2 times the sensor pixel projection dimension 210, or 1.6 times the output pixel projection dimension 556.

The height of the composite image collection profile 558 at every given image location represents the number of times this image location appears in a pixel included in the composite image collection profile. In the illustrated embodiment of FIG. 5B, in which multiline TDI sensor 110 includes four lines 120 of sensor pixels 130, this number can be between 1 and 4. "1" means only one line 120 of pixels 130 includes this image location and "4" means that the image location appears in all four lines 120 of pixels 130.

Using the methodology of FIG. 3 with an output pixel projection dimension to sensor pixel projection dimension ratio of 1.25, the height does not go above 3, which means that each image location is sampled at most 3 times in the composite image collection profile 360. Each composite image collection profile 360 has a width of 2.75 sensor pixels, or 2.2 output pixels. The maximum height of composite image collection profile 558 in FIG. 5B is 4, which means that there is at least one image location that is acquired by all 4 pixels.

The composite image collection profile 558 of the embodiment of FIGS. 5A & 5B is also more concise than the composite image collection profile 360 of the embodiment of FIG. 3, having an composite image collection profile dimension 560 of only 2 times the sensor pixel projection dimension 210, which is 0.73 (8/11) times the comparable composite image collection profile dimension 370 that would be realized had the methodology of FIG. 3 been employed with a ratio of output pixel projection to sensor pixel projection of 1.25.

An additional measure of imaging performance is the line sensor percentage, which measures the percentage of the line sensors which contribute to the collected image data at any given location along the composite image collection profile 558, measured at a location, indicated by reference number 580, having an area located at the center of the composite image collection profile 558, with a width equal to the output pixel projection dimension 556 and a height equal to the number of lines 120 on multiline TDI sensor 110. Thus, the line sensor percentage, measured at location 580, is a percentage of the area of the composite image collection profile 558 located within location 580 to the entire area of location 580.

In the prior art represented in FIG. 2, the line sensor percentage is 100%, the height of the composite image collection profile is a constant 4, but the composite image collection profile dimension 280 is small.

In the embodiment of FIGS. 4A & 4B, the line sensor percentage is 83%, as compared to the line sensor percentage of 33% of FIG. 3, and the composite image collection profile dimension 460 is larger than in the prior art but smaller than in the embodiment of FIG. 3, demonstrating the advantage of the embodiment of FIGS. 4A & 4B over the methodology of FIG. 3.

In the embodiment of FIGS. 5A & 5B, the line sensor percentage is 80%, as opposed to a line sensor percentage of 60% had the methodology of FIG. 3 been employed with a ratio of output pixel projection to sensor pixel projection of 1.25, and the composite image collection profile dimension 560 is larger than in the prior art but smaller than the composite image collection profile dimension had the methodology of FIG. 3 been employed with a ratio of output pixel projection to sensor pixel projection of 1.25, demonstrating the advantage of the embodiment of FIGS. 5A & 5B over the methodology of FIG. 3.

Figure 6A:
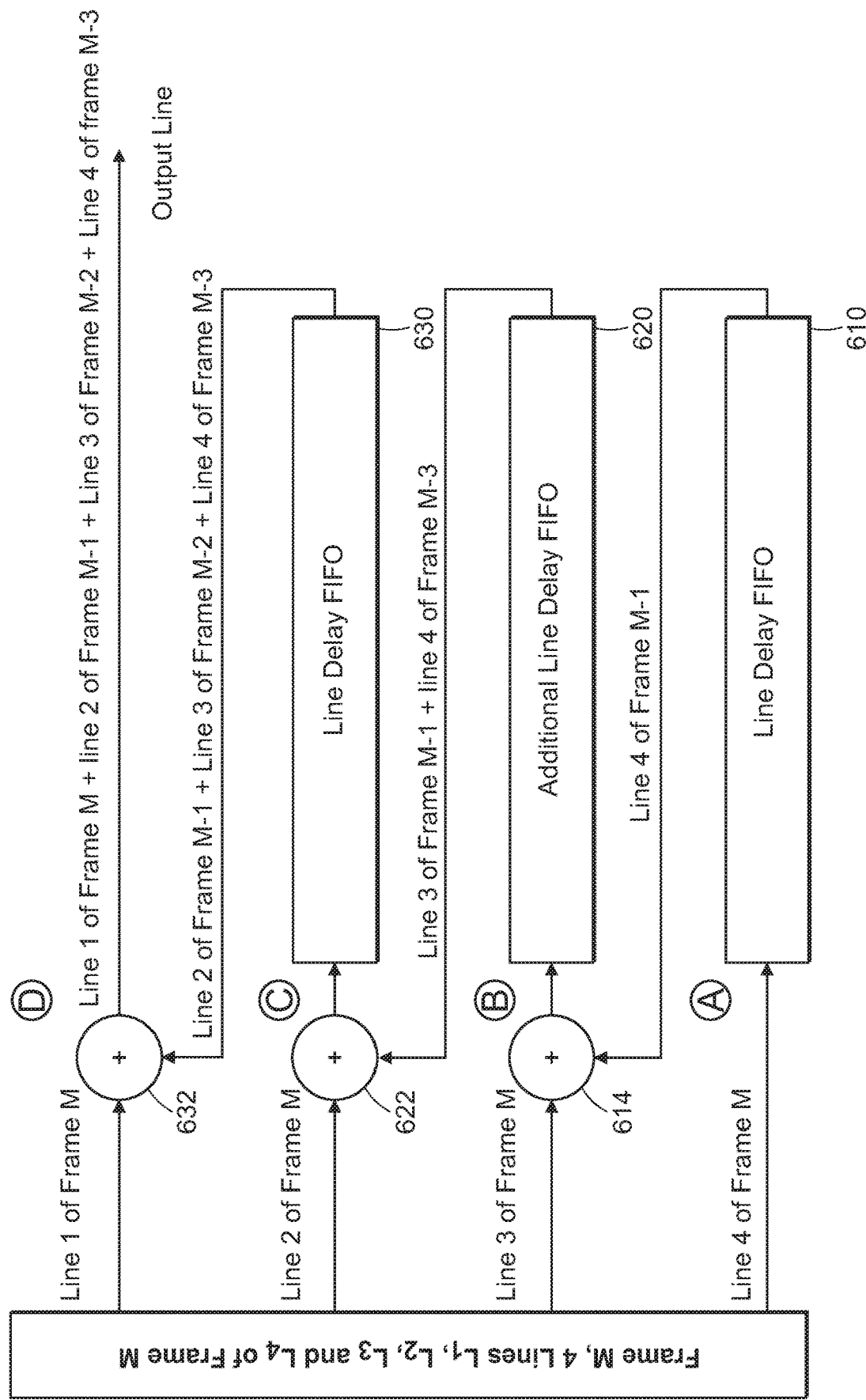
FIGS. 6A & 6B are, respectively, a TDI interconnection diagram and a composite diagram illustrating the structure and functionality representing operation of apparatus for automated inspection of electrical circuits in accordance with yet another embodiment of the present invention.
Figure 6B:
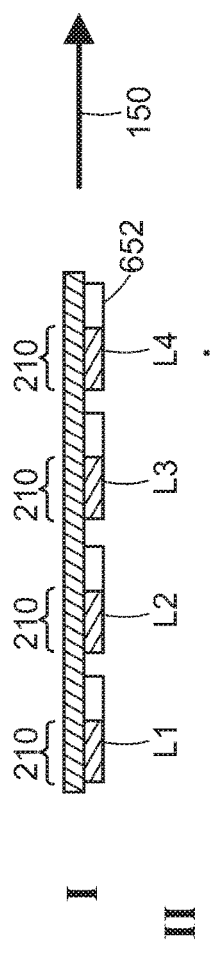
Figure 7B:
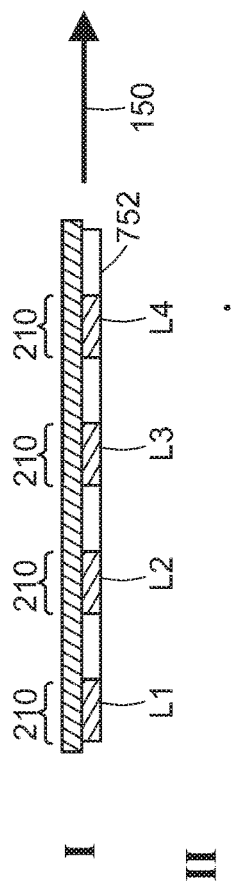

Reference is now made to FIGS. 6A & 6B, which are, respectively, a TDI interconnection diagram and a composite diagram illustrating the structure and functionality for automated inspection of electrical circuits operating in accordance with another embodiment of the present invention. In this embodiment, the distance of mutual displacement of the multiline TDI sensor 110 and the electrical circuit to be inspected 180 along the scanning axis 150 during acquisition of each line 120 thereof is 1.75 times the sensor pixel projection dimension 210 along the scanning axis 150.

As seen in FIG. 6A, at stage A, line 4 of Frame M of the output of multiline TDI sensor 110 is supplied to a 1-Frame FIFO Line Delay circuit 610. The delayed output from FIFO Line Delay circuit 610, designated as Line 4 of Frame M-1, is supplied to an adder 614, which adds it to line 3 of Frame M. At stage B, the summed output of adder 614 is supplied to a further 1-Frame FIFO Line Delay circuit 620. The delayed output from FIFO Line Delay circuit 620, designated as Line 3 of Frame M-1+Line 4 of Frame M-2, is supplied to an adder 622, which adds it to line 2 of Frame M. At stage C, the output of adder 622 is supplied to an additional 1-Frame FIFO Line Delay circuit 630. The delayed output from FIFO Line Delay circuit 630, designated as Line 2 of Frame M-1+Line 3 of Frame M-2+Line 4 of Frame M-3, is supplied to an adder 632 which adds it to line 1 of Frame M. At stage D, the summed output of adder 632, designated as Line 1 of Frame M+Line 2 of Frame M-1+Line 3 of Frame M-2+Line 4 of Frame M-3, is supplied as a TDI output.

Turning now to FIG. 6B, there is seen at I, a simplified cross-sectional representation of multiline TDI sensor 110, showing lines 1, 2, 3 and 4 of a multiline TDI sensor 110, respectively designated by designations L1, L2, L3 and L4.

There is also shown for each of lines L1-L4, the extent 652 of the mutual displacement of the multiline TDI sensor 110 and the electrical circuit to be inspected 180 along the scanning axis 150 during acquisition of each line beyond the sensor pixel projection dimension 210 of each line along the scanning axis 150. In this embodiment, the extent 652 of the mutual displacement of the multiline TDI sensor 110 and the electrical circuit to be inspected 180 along the scanning axis 150 during acquisition of each line 120 beyond sensor pixel projection dimension 210 in this embodiment is equal to 75% of the sensor pixel projection dimension 210.

At II, for each of stages A, B, C and D, there are shown:

i. reproductions of a simplified cross-sectional illustration of multiline TDI sensor 110 indicating in bold outlines 654 the output pixels 252 corresponding to those sensor pixels 130 which are included in the image data at that stage. It is noted that the output pixels 252 each have an output pixel projection dimension 656, which is comprised of sensor pixel projection dimension 210 together with the extent 652 of the mutual displacement of the multiline TDI sensor 110 and the electrical circuit to be inspected 180 along the scanning axis 150 during acquisition of each line 120 beyond sensor pixel projection dimension 210.

ii. illustrations of the output pixel projection dimensions 656 of the sensor pixels 130 which are included in the image data at that stage.

iii. illustrations of a composite image collection profile 658 of the image data at that stage, the width of the composite image collection profile 658 representing a composite image collection profile dimension 660 and the height of the composite image collection profile 658 indicating the number of sensor pixels 130 contributing to the image data at that stage.

The resulting composite image pixel collection profile dimension 660 can be compared to the composite image pixel collection profile dimension 280 of the prior art TDI arrangement shown in FIG. 2 and to the composite image collection profile dimension produced by using the methodology of FIG. 3, namely, where every $2^{nd}$ frame is used, together with an output pixel projection dimension equal to output pixel projection dimension 656 of FIGS. 6A & 6B, which is 1.75 times the sensor pixel projection dimension 210.

The composite image collection profile 658 of the embodiment of FIGS. 6A & 6B is characterized by having a relatively small composite image pixel collection profile dimension 660, greater than that provided by the prior art TDI arrangement represented by FIG. 2, but smaller than that provided by the TDI arrangement in the methodology of the embodiment of FIG. 3, and exhibits relatively lower blur than the image produced by the TDI arrangement illustrated in FIG. 3, due to the relatively smaller composite image collection profile dimension 660 of the embodiment of FIGS. 6A & 6B as compared with what would have been the composite image collection profile dimension 370 of the embodiment of FIG. 3, had an output pixel projection dimension to sensor pixel projection dimension ratio of 1.75 been used.

Comparing FIGS. 2, 3 and 6B, it is appreciated that in the embodiment of FIG. 6B, image data from all of the frames is included in the image.

Quantitatively, the composite image collection profile dimension 370 in the embodiment of FIG. 3, which would have been realized by using an output pixel projection dimension to sensor pixel projection dimension ratio of 1.75, instead of an output pixel projection dimension to sensor pixel projection dimension ratio of 1.5 used in FIG. 3, is 6.25 times the sensor pixel projection dimension 210, or 3.57 ($25/7$) times the output pixel projection dimension 656. In the embodiment of FIGS. 6A & 6B, the width of the composite image collection profile 658, i.e. the composite image collection profile dimension 660, is 2.5 times the sensor pixel projection dimension 210, or 1.43 ($10/7$) times the output pixel projection dimension 656.

As noted above, the height of the composite image collection profile 658 at every given image location represents the number of times this image location appears in a pixel included in the composite image collection profile. In the illustrated embodiment of FIG. 6B, in which multiline TDI sensor 110 includes four lines 120 of sensor pixels 130, this number can be between 1 and 4. "1" means only one line 120 of pixels 130 includes this image location and "4" means that the image location appears in all four lines 120 of pixels 130.

Using the methodology of FIG. 3 with an output pixel projection dimension to sensor pixel projection dimension ratio of 1.75, the height does not go above 2, which means that each image location is sampled at most twice in composite image collection profile 360. Each comparable composite image collection profile 360 has a width of 6.25 sensor pixels, or 3.57 output pixels. The maximum height of composite image collection profile 658 in FIG. 6B is 4, which means that there is at least one image location that is acquired by all 4 pixels.

The composite image collection profile 658 of the embodiment of FIGS. 6A & 6B is also more concise than the composite image collection profile 360 of the embodiment of FIG. 3, having an composite image collection profile dimension 660 of only 2.5 times the sensor pixel projection dimension 210, which is 0.4 (⅖) of the comparable composite image collection profile dimension 370 that would be realized had the methodology of FIG. 3 been employed with a ratio of output pixel projection to sensor pixel projection of 1.75.

An additional measure of imaging performance is the line sensor percentage, which is the percentage of the line sensors which contribute to the collected image data at any given location along the composite image collection profile 658, measured at a location, indicated by reference number 680, having an area located at the center of the composite image collection profile 658, with a width equal to the output pixel projection dimension 656 and a height equal to the number of lines 120 on multiline TDI sensor 110. Thus, the line sensor percentage, measured at location 680, is a percentage of the area of the composite image collection profile 658 located within location 680 to the entire area of location 680.

In the prior art represented in FIG. 2, the line sensor percentage is 100%, the height of the composite image collection profile is a constant 4, but the composite image collection profile dimension 280 is small.

In the embodiment of FIGS. 4A & 4B, the line sensor percentage is 83%, as compared to the line sensor percentage of 33% of FIG. 3, and the composite image collection profile dimension 460 is larger than in the prior art but smaller than in the embodiment of FIG. 3, demonstrating the advantage of the embodiment of FIGS. 4A & 4B over the methodology of FIG. 3.

In the embodiment of FIGS. 5A & 5B, the line sensor percentage is 80%, as opposed to a line sensor percentage of 60% had the methodology of FIG. 3 been employed with a ratio of output pixel projection to sensor pixel projection of 1.25, and the composite image collection profile dimension 560 is larger than in the prior art but smaller than the composite image collection profile dimension had the methodology of FIG. 3 been employed with a ratio of output pixel projection to sensor pixel projection of 1.25, demonstrating the advantage of the embodiment of FIGS. 5A & 5B over the methodology of FIG. 3.

In the embodiment of FIGS. 6A & 6B, the line sensor percentage is 86%, as opposed to a line sensor percentage of 29% had the methodology of FIG. 3 been employed with a ratio of output pixel projection to sensor pixel projection of 1.75, and the composite image collection profile dimension 660 is larger than in the prior art but smaller than the composite image collection profile dimension had the methodology of FIG. 3 been employed with a ratio of output pixel projection to sensor pixel projection of 1.75, demonstrating the advantage of the embodiment of FIGS. 6A & 6B over the methodology of FIG. 3.

Reference is now made to FIGS. 7A & 7B, which are respectively a TDI interconnection diagram and a composite diagram illustrating the structure and functionality for automated inspection of electrical circuits operating in accordance with another embodiment of the present invention. In this embodiment, the distance of mutual displacement of the multiline TDI sensor 110 and the electrical circuit to be inspected 180 along the scanning axis 150 during acquisition of each line 120 thereof is 2 times the sensor pixel projection dimension 210 along the scanning axis 150.

As seen in FIG. 7A, at stage A, line 4 of Frame M of the output of multiline TDI sensor 110 is supplied to a 1-Frame FIFO Line Delay circuit 710. The delayed output from FIFO Line Delay circuit 710, designated as Line 4 of Frame M-1, is supplied to an adder 714, which adds it to line 3 of Frame M. At stage B, the summed output of adder 714 is supplied to a further 1-Frame FIFO Line Delay circuit 720. The delayed output from FIFO Line Delay circuit 720, designated as Line 3 of Frame M-1+Line 4 of Frame M-2, is supplied to an adder 722, which adds it to line 2 of Frame M. At stage C, the output of adder 722 is supplied to an additional 1-Frame FIFO Line Delay circuit 730. The delayed output from FIFO Line Delay circuit 730, designated as Line 2 of Frame M-1+Line 3 of Frame M-2+Line 4 of Frame M-3, is supplied to an adder 732 which adds it to line 1 of Frame M. At stage D, the summed output of adder 732, designated as Line 1 of Frame M+Line 2 of Frame M-1+Line 3 of Frame M-2+Line 4 of Frame M-3, is supplied as a TDI output.

Turning now to FIG. 7B, there is seen at I, a simplified cross-sectional representation of multiline TDI sensor 110, showing lines 1, 2, 3 and 4 of a multiline TDI sensor 110, respectively designated by designations L1, L2, L3 and L4.

There is also shown for each of lines L1-L4, the extent 752 of the mutual displacement of the multiline TDI sensor 110 and the electrical circuit to be inspected 180 along the scanning axis 150 during acquisition of each line beyond the sensor pixel projection dimension 210 of each line along the scanning axis 150. In this embodiment, the extent 752 of the mutual displacement of the multiline TDI sensor 110 and the electrical circuit to be inspected 180 along the scanning axis 150 during acquisition of each line 120 beyond sensor pixel projection dimension 210 in this embodiment is equal to 100% of the sensor pixel projection dimension 210.

At II, for each of stages A, B, C and D, there are shown:
  i. reproductions of a simplified cross-sectional illustration of multiline TDI sensor 110 indicating in bold outlines 754 the output pixels 252 corresponding to those sensor pixels 130 which are included in the image data at that stage. It is noted that the output pixels 252 each have an output pixel projection dimension 756, which is comprised of sensor pixel projection dimension 210 together with the extent 752 of the mutual displacement of the multiline TDI sensor 110 and the electrical circuit to be inspected 180 along the scanning axis 150 during acquisition of each line 120 beyond sensor pixel projection dimension 210.
  ii. illustrations of the output pixel projection dimensions 756 of the sensor pixels 130 which are included in the image data at that stage.
  iii. illustrations of the composite image collection profile 758 of the image data at that stage, the width of the composite image collection profile 758 representing a composite image collection profile dimension 760 and the height of the composite image collection profile 758 indicating the number of sensor pixels 130 contributing to the image data at that stage.

The resulting composite image pixel collection profile dimension 760 can be compared to the composite image pixel collection profile dimension 280 of the prior art TDI arrangement shown in FIG. 2 and to the composite image pixel collection profile dimension produced by using the methodology of FIG. 3, namely, where every $2^{nd}$ frame is used, with the output pixel projection dimension 756 of FIGS. 7A & 7B, which is 2.00 times the sensor pixel projection dimension 210.

The composite image collection profile 758 of the embodiment of FIGS. 7A & 7B is characterized by having a relatively small composite image pixel collection profile dimension 760, greater than that provided by the prior art TDI arrangement represented by FIG. 2, but smaller than that provided by the TDI arrangement in the methodology of the embodiment of FIG. 3, and exhibits relatively lower blur than the image produced by the TDI arrangement illustrated in FIG. 3, due to the relatively smaller composite image collection profile dimension 760 of the embodiment of FIGS. 7A & 7B as compared with what would have been the composite image collection profile dimension 370 of the embodiment of FIG. 3, had an output pixel projection dimension to sensor pixel projection dimension ratio of 2.00 been used.

Comparing FIGS. 2, 3 and 7B, it is appreciated that in the embodiment of FIG. 7B, image data from all of the frames is included in the image. Quantitatively, the composite image collection profile dimension 370 in the embodiment of FIG. 3 which would have been realized by using an output pixel projection dimension to sensor pixel projection dimension ratio of 2.00, instead of an output pixel projection dimension to sensor pixel projection dimension ratio of 1.5 used in FIG. 3, is 8 times the sensor pixel projection dimension 210, or 4 times the output pixel projection dimension 756. In the embodiment of FIGS. 7A & 7B, the width of the composite image collection profile 758, i.e. the composite image collection profile dimension 760, is 2 times the sensor pixel projection dimension 210, or equal to output pixel projection dimension 756.

As noted above, the height of the composite image collection profile 758 at every given image location represents the number of times this image location appears in a pixel included in the composite image collection profile. In the illustrated embodiment of FIG. 7B, in which multiline TDI sensor 110 includes four lines 120 of sensor pixels 130, this number can be between 1 and 4. "1" means only one line 120 of pixels 130 includes this image location and "4" means that the image location appears in all four lines 120 of pixels 130.

Using the methodology of FIG. 3 with an output pixel projection dimension to sensor pixel projection dimension ratio of 2.00, the height does not go above 1, which means that each image location is sampled once in the composite image collection profile 360. Each comparable composite image collection profile 360 has a width of 8 sensor pixels, or 4 output pixels. The maximum height of composite image collection profile 758 in FIG. 7B is 4, which means that there is at least one image location that is acquired by all 4 pixels.

The composite image collection profile 758 of the embodiment of FIGS. 7A & 7B is also more concise than the composite image collection profile 360 of the embodiment of FIG. 3, having an composite image collection profile dimension 760 of only 2 times the sensor pixel projection dimension 210, which is 0.25 (¼) times the comparable composite image collection profile dimension 370 that would be realized had the methodology of FIG. 3 been employed with a ratio of output pixel projection to sensor pixel projection of 2.00.

An additional measure of imaging performance is the line sensor percentage, which is the percentage of the line sensors which contribute to the collected image data at any given location along the composite image collection profile 758, measured at a location, indicated by reference number 780, having an area located at the center of the composite image collection profile 758, with a width equal to the output pixel projection dimension 756 and a height equal to the number of lines 120 on multiline TDI sensor 110. Thus, the line sensor percentage, measured at location 780, is a percentage of the area of the composite image collection profile 758 located within location 780 to the entire area of location 780.

In the prior art represented in FIG. 2, the line sensor percentage is 100%, the height of the composite image collection profile is a constant 4, but the composite image collection profile dimension 280 is small.

In the embodiment of FIGS. 4A & 4B, the line sensor percentage is 83%, and the composite image collection profile dimension 460 is larger than in the prior art but smaller than in the embodiment of FIG. 3, demonstrating the advantage of the embodiment of FIGS. 4A & 4B over the methodology of FIG. 3.

In the embodiment of FIGS. 5A & 5B, the line sensor percentage is 80%, and the composite image collection profile dimension 560 is larger than in the prior art but smaller than in the embodiment of FIG. 3, demonstrating the advantage of the embodiment of FIGS. 5A & 5B over the methodology of FIG. 3.

In the embodiment of FIGS. 6A & 6B, the line sensor percentage is 86%, and the composite image collection profile dimension 560 is larger than in the prior art but smaller than in the embodiment of FIG. 3, demonstrating the advantage of the embodiment of FIGS. 6A & 6B over the methodology of FIG. 3.

In the embodiment of FIGS. 7A & 7B, the line sensor percentage is 100%, the same as in the prior art embodiment shown in FIG. 2, as opposed to a line sensor percentage of 25% had the methodology of FIG. 3 been employed with a ratio of output pixel projection to sensor pixel projection of 2.00, and the composite image collection profile dimension 760 is identical to output pixel projection dimension, which is 1.0 in the prior art and 2.0 in the embodiment of FIGS. 7A & 7B, and is significantly smaller than composite image collection profile dimension 370 of the embodiment of FIG. 3, demonstrating the advantage of the embodiment of FIGS. 7A & 7B over the methodology of FIG. 3.

It is appreciated that all cases, the embodiments of FIGS. 4A & 4B, 5A-5B, 6A-6B and 7A-7B are superior to that of FIG. 3.

Selection between the embodiments of 4A & 4B, 5A-5B, 6A-6B and 7A-7B and other possible embodiments having different ratios of output pixel projection dimension to sensor pixel projection dimension is typically based on job requirements, namely what is the maximum pixel size that can be employed for a given inspection task.

This selection may be efficiently carried out using the arrangement described hereinbelow with reference to FIG. 8.

A summary comparison of the embodiments of FIGS. 3, 4A & 4B, 5A-5B, 6A-6B and 7A-7B appears in Table 1 below:

TABLE 1

| Ratios | FIGS. | | | |
|---|---|---|---|---|
| | 5A/B | 4A/B | 6 A/B | 7A/B |
| Sensor Pixel Projection Dimension to Output Pixel Projection Dimension | 1.25 | 1.5 | 1.75 | 2.0 |
| Composite Output Pixel Projection Dimension to Sensor Pixel Projection Dimension as per methodology of FIG. 3 | 2.75 | 4.50 | 6.25 | 8.00 |
| Composite Output Pixel Projection Dimension to Output Pixel Projection Dimension as per methodology of FIG. 3 | 2.2 | 3.0 | 3.57 (25/7) | 4.0 |
| Composite Output Pixel Projection Dimension to Sensor Pixel Projection Dimension | 2.0 | 2.5 | 2.5 | 2.0 |
| Composite Output Pixel Projection Dimension to Output Pixel Projection Dimension | 1.6 | 1.66 (5/3) | 1.43 (10/7) | 1.0 |
| Composite Output Pixel Projection Dimension to Composite Output Pixel Projection Dimension for methodology of FIG. 3 | 0.73 (8/11) | 0.56 (5/9) | 0.40 (2/5) | 0.25 (1/4) |

Figure 8:
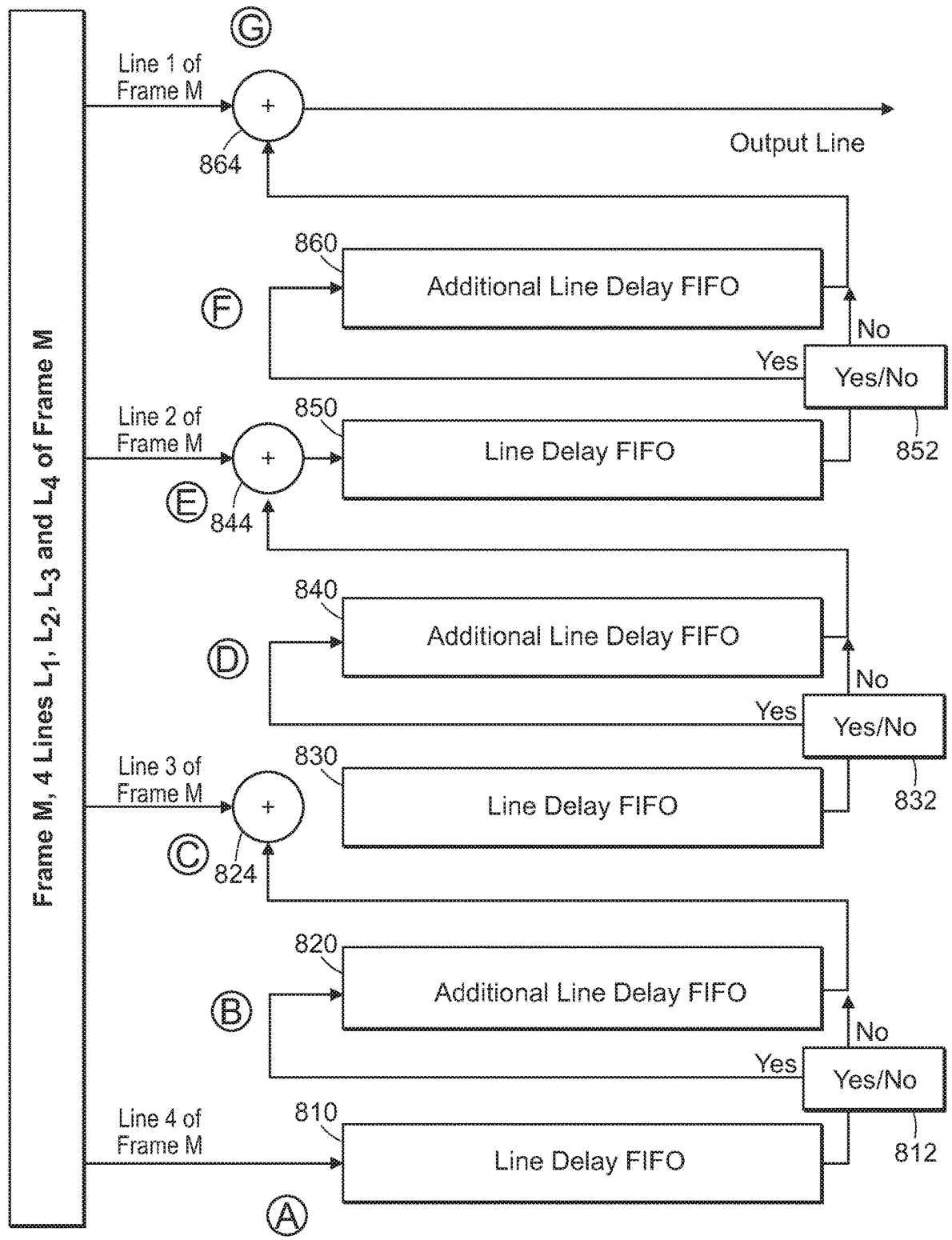
FIG. 8 is a TDI interconnection diagram illustrating a selectable TDI arrangement which enables implementation of any of the embodiments of FIGS. 4A-7B.

Reference is now made to FIG. 8, which is a TDI interconnection diagram illustrating a selectable TDI arrangement which enables implementation of any of the embodiments of FIGS. 4A-7B. In this embodiment, the distance of mutual displacement of the multiline TDI sensor 110 and the electrical circuit to be inspected 180 along the scanning axis 150 during acquisition of each line 120 thereof is selectable by the operator to be 1.25, 1.5, 1.75 or 2 times the sensor pixel projection dimension 210 along the scanning axis 150. It is appreciated that other ratios could also be realized by modifications of the arrangement shown in FIG. 8. It is further appreciated that the any ratio between 1.00 and 2.00 may be achieved utilizing the arrangement shown in FIG. 8.

As seen in FIG. 8, at stage A, line 4 of Frame M of the output of multiline TDI sensor 110 is supplied to a 1-Frame FIFO Line Delay circuit 810. The delayed output from FIFO Line Delay circuit 810 is supplied to an operator selectable switch 812 which governs whether the output from FIFO Line Delay circuit 810 is supplied, at stage B, to an additional FIFO Line Delay circuit 820, the delayed output of which is supplied to an adder 824, or is supplied directly to adder 824, which adds it to line 3 of Frame M.

At stage C, the summed output of adder 824, which includes the output of either of FIFO Line Delay circuit 810 or additional FIFO Line Delay circuit 820, is supplied to a further 1-Frame FIFO Line Delay circuit 830.

The delayed output from FIFO Line Delay circuit 830 is supplied to an operator selectable switch 832 which governs whether the output from FIFO Line Delay circuit 830 is supplied, at stage D, to an additional FIFO Line Delay circuit 840, the delayed output of which is supplied to an adder 844, or is supplied directly to adder 844, which adds it to line 2 of Frame M.

At stage E, the output of adder 844 is supplied to an additional 1-Frame FIFO Line Delay circuit 850. The delayed output from FIFO Line Delay circuit 850 is supplied to an operator selectable switch 852, which governs whether the output from FIFO Line Delay circuit 850 is supplied, at stage F, to an additional FIFO Line Delay circuit 860, the delayed output of which is supplied to an adder 864, or is supplied directly to adder 864, which adds it to line 1 of Frame M. At stage G, the summed output of adder 864 is supplied as a TDI output.

It is appreciated that by employing the arrangement of FIG. 8, the distance of mutual displacement of the multiline TDI sensor 110 and the electrical circuit to be inspected 180 along the scanning axis 150 during acquisition of each line 120 thereof is selectable by the operator to be 1.25 times the sensor pixel projection dimension 210 along the scanning axis 150, as shown in FIGS. 5A & 5B, by setting switch 812 to YES, switch 832 to NO and switch 852 to YES.

Similarly, it is appreciated that by employing the arrangement of FIG. 8, the distance of mutual displacement of the multiline TDI sensor 110 and the electrical circuit to be inspected 180 along the scanning axis 150 during acquisition of each line 120 thereof is selectable by the operator to be 1.50 times the sensor pixel projection dimension 210 along the scanning axis 150, as shown in FIGS. 4A & 4B, by setting switch 812 to NO, switch 832 to YES and switch 852 to NO.

It is further appreciated that by employing the arrangement of FIG. 8, the distance of mutual displacement of the multiline TDI sensor 110 and the electrical circuit to be inspected 180 along the scanning axis 150 during acquisition of each line 120 thereof is selectable by the operator to be 1.75 times the sensor pixel projection dimension 210 along the scanning axis 150, as shown in FIGS. 6A & 6B, by setting switch 812 to NO, switch 832 to NO and switch 852 to NO.

Similarly it is appreciated that by employing the arrangement of FIG. 8, the distance of mutual displacement of the multiline TDI sensor 110 and the electrical circuit to be inspected 180 along the scanning axis 150 during acquisition of each line 120 thereof is selectable by the operator to be 2.00 times the sensor pixel projection dimension 210 along the scanning axis 150, as shown in FIGS. 7A & 7B, by setting switch 812 to NO, switch 832 to NO and switch 852 to NO.

It will be appreciated by persons skilled in the art that the present invention is not limited to the specific embodiments described hereinabove. Rather the scope of the present invention includes combinations and subcombinations of the various features described herein as well as modifications and variations thereof which would occur to a person skilled in the art upon reading the foregoing.

The invention claimed is:

1. An apparatus for inspecting electrical circuits comprising:
a scanner including:
at least one multiline Time Delay Integration (TDI) sensor having multiple parallel lines of sensor pixels, each of said parallel lines extending along a line axis, said multiple lines of sensor pixels being separated from each other by a separation distance along a scanning axis that is perpendicular to said line axis, each of said sensor pixels having a sensor pixel dimension along said scanning axis;
a linear displacer providing mutual displacement of said multiline TDI sensor and an electrical circuit to be inspected along said scanning axis; and
scanning optics directing light reflected from said electrical circuit to said sensor pixels, said scanning optics defining a projection of each of said sensor pixels onto said electrical circuit, wherein said projection defines an area on the electrical circuit from which light reaches each of said sensor pixels, said projection having a sensor pixel projection dimension along said scanning axis;
said multiline TDI sensor and said linear displacer being operative such that a distance of mutual displacement of said multiline TDI sensor and said electrical circuit to be inspected along said scanning axis during acquisition of each line thereof is greater than said sensor pixel projection dimension along said scanning axis, and an image generator configured to construct an image from composite output pixels of the multiline TDI sensor, wherein said image comprises a plurality of said composite output pixels each having a composite image collection profile along said scanning axis, said composite image collection profile having a dimension along said scanning axis which is greater than said sensor pixel projection dimension.

2. The apparatus for inspecting electrical circuits according to claim 1, wherein said composite output pixels each comprise multiple partially overlapping output pixels acquired from a plurality of said sensor pixels located at different lines of said multiline TDI sensor, each of said output pixels acquired by each of said plurality of sensor pixels including at least an identical feature of said electrical circuit.

3. The apparatus for inspecting electrical circuits according to claim 2, wherein said multiple partially overlapping output pixels each have an output pixel projection dimension along said scanning axis which comprises said sensor pixel projection dimension together with an extent to which the mutual displacement of said multiline TDI sensor and said electrical circuit to be inspected along said scanning axis during acquisition of each of said multiple parallel lines exceeds said sensor pixel projection dimension.

4. The apparatus for inspecting electrical circuits according to claim 1, wherein said separation distance between said multiple parallel lines of sensor pixels is equal to an integer multiple of said sensor pixel dimension.

5. The apparatus for inspecting electrical circuits according to claim 1, wherein said separation distance between said multiple parallel lines of sensor pixels is equal to zero.

6. The apparatus for inspecting electrical circuits according to claim 1, wherein said linear displacer is a bi-directional linear displacer.

7. The apparatus for inspecting electrical circuits according to claim 1, wherein said distance of mutual displacement of said multiline TDI sensor and said electrical circuit to be inspected along said scanning axis during acquisition of each line thereof exceeds said sensor pixel projection dimension along said scanning axis by an operator selectable extent.

8. The apparatus for inspecting electrical circuits according to claim 1, further comprising an operator selectable mutual displacement selector configured for operator selection of said distance of mutual displacement of said multiline TDI sensor and said electrical circuit to be inspected along said scanning axis during acquisition of each line thereof.

9. A method for inspecting electrical circuits, the method comprising:
providing a scanner including at least one multiline Time Delay Integration (TDI) sensor having multiple parallel lines of sensor pixels, each of said parallel lines extending along a line axis, said multiple lines of sensor pixels being separated from each other by a separation distance along a scanning axis that is perpendicular to said line axis, each of said sensor pixels having a sensor pixel dimension along said scanning axis;
defining a mutual displacement distance of said multiline TDI sensor and an electrical circuit to be inspected along said scanning axis during acquisition of each of said multiple lines of said multiline TDI sensor;
mutually displacing, by said mutual displacement distance, said multiline TDI sensor and said electrical circuit to be inspected along said scanning axis;
directing, using scanning optics, light reflected from said electrical circuit to said sensor pixels, said scanning optics defining a projection of each of said sensor pixels onto said electrical circuit, wherein said projection defines the area on the electrical circuit from which light reaches each of said sensor pixels, said projection having a sensor pixel projection dimension along said scanning axis, said mutual displacement distance being greater than said sensor pixel projection dimension along said scanning axis, and constructing an image from composite output pixels of the multiline TDI sensor, said image comprising a plurality of said composite output pixels, each of said composite output pixels having a composite image collection profile along said scanning axis, said composite image collection profile having a composite image collection profile dimension along said scanning axis which is greater than said sensor pixel projection dimension.

10. The method for inspecting electrical circuits according to claim 9 and wherein said constructing an image comprises:
for each of said composite output pixels:
acquiring multiple partially overlapping output pixels from a plurality of said sensor pixels located at different lines of said multiline TDI sensor, each of said output pixels acquired by each of said plurality of sensor pixels including at least an identical feature of said electrical circuit; and
combining said multiple partially overlapping output pixels into said composite output pixel.

11. The method for inspecting electrical circuits according to claim 9 and wherein said defining a mutual displacement distance comprises selecting, by an operator, said mutual displacement distance from multiple possible displacement distances.

12. The method for inspecting electrical circuits according to claim 9 and also comprising generating square pixels from said output pixels, said generating square pixels comprising:
- generating an interpolated output pixel by interpolating said output pixels in a direction of said line axis; and
- resizing said interpolated output pixel to have a dimension along said line axis equal to said mutual displacement distance.

\* \* \* \* \*